(12) United States Patent  
Sanz-Pastor et al.

(10) Patent No.: US 8,706,719 B1  
(45) Date of Patent: Apr. 22, 2014

(54) LOCAL SEARCH OPTIMIZATION USING PERSONAL FOOTPRINTS

(75) Inventors: Ignacio Sanz-Pastor, San Francisco, CA (US); David L. Morgan, Leawood, KS (US); Javier Castellar, Truckee, CA (US); Luis A. Barcena, Sunnyvale, CA (US); Christopher E. Blumenthal, Scotts Valley, CA (US)

(73) Assignee: Aechelon Technology, Inc., San Francisco, CA (US)

( * ) Notice: Subject to any disclaimer, the term of this patent is extended or adjusted under 35 U.S.C. 154(b) by 179 days.

(21) Appl. No.: 12/854,167

(22) Filed: Aug. 10, 2010

Related U.S. Application Data

(60) Provisional application No. 61/232,761, filed on Aug. 10, 2009.

(51) Int. Cl.
 *G06F 17/30* (2006.01)

(52) U.S. Cl.
 USPC .......................................... 707/724; 707/803

(58) Field of Classification Search
 None
 See application file for complete search history.

(56) References Cited

U.S. PATENT DOCUMENTS

| | | | | |
|---|---|---|---|---|
| 2008/0086464 | A1* | 4/2008 | Enga | 707/4 |
| 2008/0248815 | A1* | 10/2008 | Busch | 455/456.5 |
| 2010/0082593 | A1* | 4/2010 | Singh | 707/707 |

* cited by examiner

*Primary Examiner* — Hosain Alam  
*Assistant Examiner* — Bruce Witzenburg  
(74) *Attorney, Agent, or Firm* — Fenwick & West LLP

(57) ABSTRACT

A user's physical location and the time the user is at that location are sampled by an network-enabled mobile computing device at certain intervals, and used to construct a representation of the comparative relevance of the different physical locations where the user lives. This representation is then used then to optimize and prioritize results returned by a local network search operation, informing the user about which search result would be optimal for the user at her intended time for use of that choice.

17 Claims, 8 Drawing Sheets

LOCAL SEARCH OPTIMIZATION USING PERSONAL FOOTPRINTS

CROSS-REFERENCE TO RELATED APPLICATIONS

This application claims the benefit of U.S. Provisional Application 61/232,761, filed on Aug. 10, 2009, and incorporated by reference herein in its entirety.

BACKGROUND

1. Field of the Invention

The present invention relates to the field of Internet search on mobile computer devices.

2. Description of the Related Art

Efficient and relevant Internet search capabilities are among the key enabling factors that make the World Wide Web the primary resource for the management of global knowledge. It is virtually impossible to make any use of the immense amount of content, ideas, products and information available on the web if a user is unable to find what the user needs when the user needs it.

Search engines have progressed phenomenally since their relatively recent inception, with great innovation from the early web crawlers and manual index attempts, to the emergence of Google and its PageRank algorithm as the most prominent solution to the problem, to the creation of more specialized solutions that focus on specific vertical segments or technologies such as natural language, voice or real time search, including the convergence of Internet mapping and search applications in what has been called local search and other location-based services. The prominence of network enabled portable devices such as laptops, PDAs and cell phones, many of them also equipped with location-aware capabilities, makes local search capabilities more relevant than ever.

A perfect search engine would be "prescient"—given a user's brief description of what she needs to know, using its vast databases in combination with its knowledge about the user, her environment and needs, the search engine would respond with exactly the information she is looking for, and nothing else. Even with recent progress, this is often not the result of such a search, and often users have to look in the search results, both free and for pay, to find what is relevant to them in a relatively long list.

One useful way to optimize relevance is through the use of localized searches. In certain cases, the physical location of what we search for is extremely important—for example, finding a pizzeria open within a few blocks of the theater where the user is located. Services such as search on Google Maps or Yahoo Local provide localized results to both computers and mobile devices. These services are, however, tied to a specified area of interest or a user's current location.

SUMMARY

The present invention enables users to obtain relevant search results based on locations convenient for the user. Using the described invention, users can find places, services and things close not only to their immediate location at search time, but also to locations that the users frequent—for example, a commuting route. For example, while a conventional search engine might return many results in response to the query "oil change in the San Francisco Bay Area," and a local search can provide the most popular or prominent places in the area, the present invention enables what is perhaps the most convenient solution for the user—search results that take into account where the user is likely to be, not just at search time, but in the coming hours or days. For example, the best search result from the user's perspective might be an oil change location near to the user's work and open at the lunch hour, even though the user performed the search from her home. Current local search systems allow the user to manually specify a new location at search time (in this case the user's office) and find new places, but the initiative has to come from the user—and this may preclude discovering, for example, that there is also a convenient place next to the gym the user goes to everyday.

The present invention enables the return of search results prioritized by their relative proximity to areas in which the searching user spends most of her time in the specified time frame—for example, on weekdays, weekend afternoons, during the morning commute or in areas close to where many of her friends usually spend time.

A basis for the relevance of these results is the observation that people tend to live a significant part of their lives within a relatively small radius of a limited set of locations, and that their presence in these locations is extremely periodic as they carry out their daily routines. For example, many people have a limited set of places at which they perform their work Monday through Friday; a relatively set time and route for their commute to and from work; periodic times during which they go to the same gym; and have a relatively limited set of places where they can be found on weekend days at a given time. Finding services and places close to these areas of special relevance to where they live their lives makes it easier for them to use those services at a convenient time or discover new, convenient services or places.

In one embodiment, a network-enabled mobile computing device is used to collect samples of the user's location and the time of the week at which the sample is collected. The sampling can be made automatically at periodic intervals determined by the user, or at specific times when the user triggers a manually-sampled event, and it can by enabled and disabled by the user as desired. In addition, the user can manually add locations to the sample database by specifying a location's coordinates or a nearby landmark. Each sample stores the positional coordinates of the device's location—for example, in latitude longitude coordinates or some gridded representation of those, and the time of the week measured, e.g., in fractional hours from 0.0 to 168.0

As samples are collected while the users carry out their weekly routines, patterns start to emerge, and samples tend to cluster around certain locations at certain times. There may be areas where there are many repeated samples in the morning of workdays—perhaps the user's favorite breakfast spot—but those same areas may be visited only rarely at night or during weekends.

In one embodiment, the data collected is stored in a gridded data structure that is processed to form a two-dimensional field of scalar values. We call this scalar value field the user's personal footprint. In one embodiment, only the sample location is used, allowing applications such as search engines or mapping applications to compare the location of known items (for example, coffee shops), with the interpolated scalar value in the field of each location, and to use the computed value for each target item as one of the factors in ordering results to improve relevance to the user. In more targeted queries, the user can specify a given timeframe, for example weekday mornings from 8:00 AM to 10:00 AM, and the timeframe acts as a filter to weigh the value of the samples in the personal footprint that are closest to that timeframe, and reduce the relevance of the rest of the samples when the interpolated value for the different coordinates of the candidate items are computed. Other filters combining position and time are possible as well, to enable, for example, detection of the most-traveled routes for a user, given the sequential nature of collected samples both in time and location when the user is on the go.

These methods of optimization and prioritization of search results are relevant to the user not just in a categorical taxonomy or tied to a specific location or area, but are located in areas closest to where they live their lives and spend most of their time.

In addition, in other applications such as social networking, the overlap of the personal footprints of different users can be used to prioritize search results or recommend locations in areas that are most relevant or closest to a group of people, or to optimize resource allocation in business search applications.

DETAILED DESCRIPTION

Figure 1:
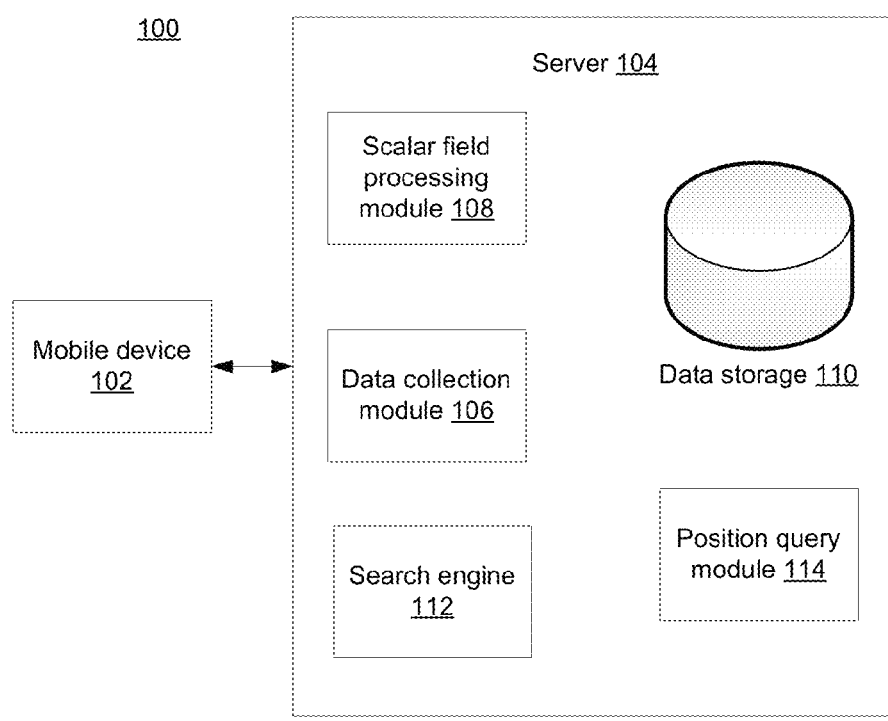
FIG. 1 is a block diagram of a system for performing local search optimization using personal footprints in accordance with an embodiment of the present invention.

FIG. 1 is a block diagram of a system 100 for performing local search optimization using personal footprints in accordance with an embodiment of the present invention. System 100 in the illustrated embodiment includes a network-enabled mobile computing device 102, such as a cell phone, PDA, smartphone, GPS, or similar device; and a server 104. Server 104 includes a data collection module 106; a scalar value field processing module 108; a data storage module 110; a search query application engine 112; and a position query module 114. These modules can reside and operate locally on mobile device 102, or on a remote server 104 connected to the mobile computing device via its wireless network.

Location enabled mobile computing device 102 may be a smartphone, PDA, or other mobile computing device, including, for example, an Apple iPhone, Motorola Droid, and the like. Mobile device 102 sends sample data and queries to server 104 over a network, which in one embodiment is a cellular network, but in alternative embodiments may be any suitable network, including, for example, WiMAX. In an alternative embodiment, some or all of the components of server 104 are resident on mobile device 102 itself. Position sample data is processed by the data collection module 106, and sample values are stored on data store 110. In various embodiments, a quadtree data structure is used to store sample data, as further described below. Sample data is then processed by the scalar field processing module 108, which also stores the resulting scalar data field values on storage 110 on the same or an independent quadtree data structure. Mobile computing device 102 also sends queries over the network to applications such as search engine 112, which prioritizes results with the aid of the position query module 114 and then returns the desired information to computing device 102.

In one embodiment, location and time data samples are captured at periodic intervals by network-enabled mobile computing device 102, which as noted may be a cell phone, PDA, GPS or any other networked device that is location aware. A representation of the device's location identified using its latitude-and-longitude coordinates, UTM coordinates, or other geocoding convention, and the time at which the sample is collected are determined and stored either on the device's memory or local storage, or sent over the network for storage on server 104. In one embodiment, collection time is measured as a number of hours elapsed since the beginning of the week, i.e. as fractional hours from 0.0 to 168.0. Those of skill will recognize that many suitable ways exist to identify collection time. For ease of discussion, we presume below that fractional hours of the week are used, but the example is not intended to be limiting.

In one embodiment, data capture occurs automatically on mobile device 102. In various embodiments, data capture is configurable by the user to occur at periodic intervals of time, space or both. In certain embodiments, data capture can be manually triggered to have a sample taken at a given location and time, and can under user control be enabled and disabled in order to protect the user's privacy, as desired. As an alternate input method, the user manually inputs or selects a coordinate or landmark to be stored among the collected samples, with an optional time range associated with it.

Figure 2:
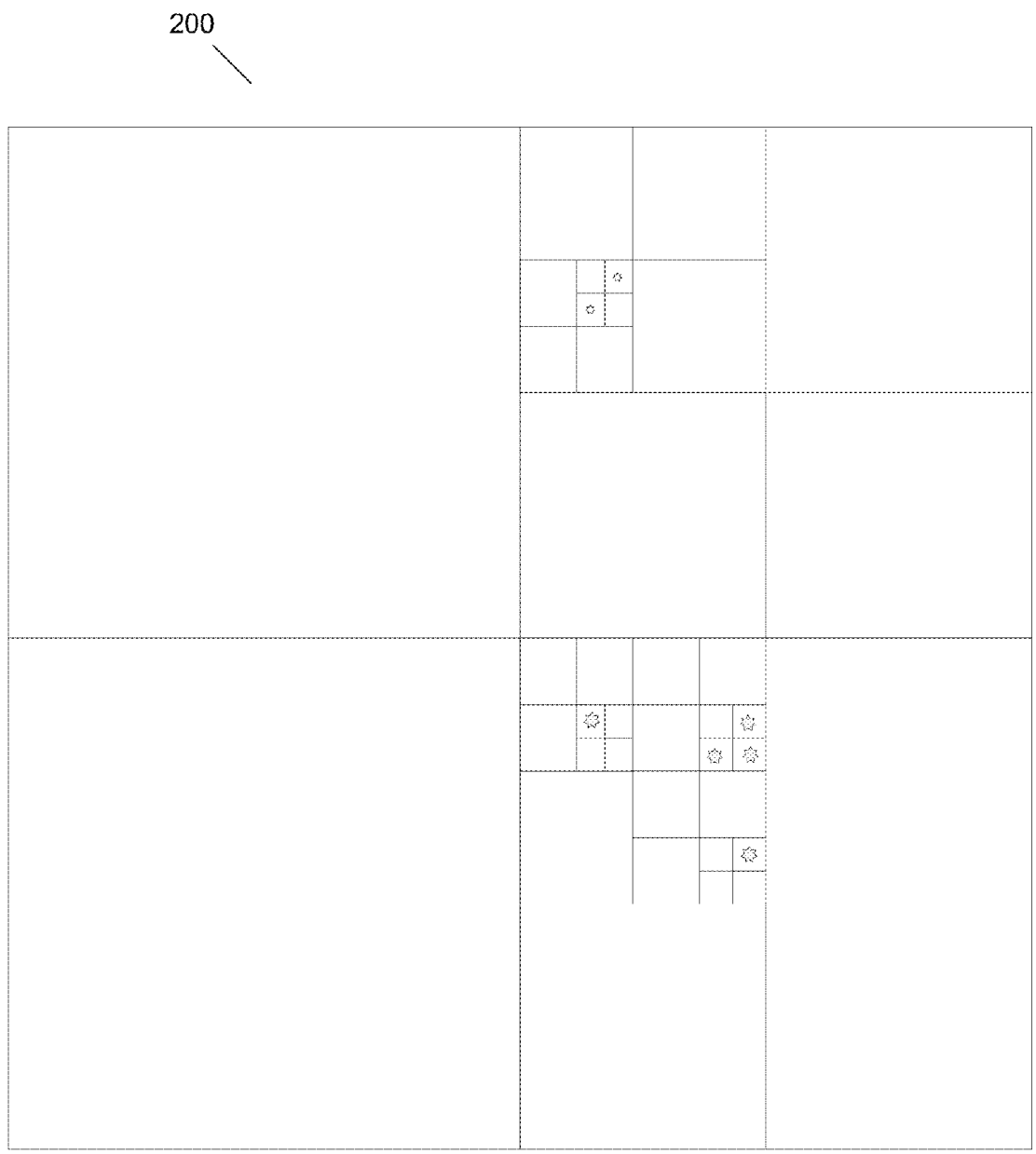
FIG. 2 is a diagram illustrating a spatial structuring of collected data samples in accordance with an embodiment of the present invention.

In one embodiment, the captured data samples are stored by the data collection module 106 on regularly-sized cells according to their geographic location, on a tree data structure called a region quadtree, well-known to those versed in the art of computational geometry. In the quadtree, each base cell in the target area, which in one embodiment is a regular tiling of the whole or a subset of the planet in cells of uniform size in degrees, is recursively split if empty into four equal-sized cells until the desired final cell size is reached, and a list of samples is created and stored on the final cell. Quadtree data storage 110 stores the quadtrees in one embodiment. This allows, as FIG. 2 illustrates, a sparsely-populated tiling scheme 200 where cells are created only in areas where samples are present, while in areas where there is no data collected the cells are many times larger and do not consume memory and storage.

Each data sample stored on the final-sized cell in one embodiment includes an implicit geographic coordinate, by virtue of which base cell and quadtree final sub-cell it is located at, and a fractional time of the week value in hours (0.0 to 168.0). Initially, the samples do not show any internal order, but over time samples tend to cluster around specific areas where the user spends most of her time, and the time of week values also tend to cluster, since users have routines that are highly periodic in nature, allowing location patterns to emerge that reflect the most relevant areas in a person's daily life.

The collected data samples are processed by the value field processing module 108 into a scalar grid of scalar values that constitutes a "personal footprint" for the user's activities, by in one embodiment counting all the samples present at each highest-resolution base cell, and then propagating and averaging the values to the parent quadtree cells for all desired levels in a traversal of the data structure. For example, if we have an area with four high-resolution cells, one with three samples, one with two and two with none, the first cell will have a scalar value of three, the second of two and the other two, zero. The parent cell in the quadtree structure will have a value equal to the sum of its four cell's values divided by 4—in this case, 1.25. The value will continue to be propagated up the chain until a value is determined for the base cell. The traversal first descends into the cells of the quadtree structure until the base leaf nodes are reached and their number of samples is counted, and then it will propagate the combined values up the tree recursively until all the populated cells have an associated scalar value.

Figure 3:
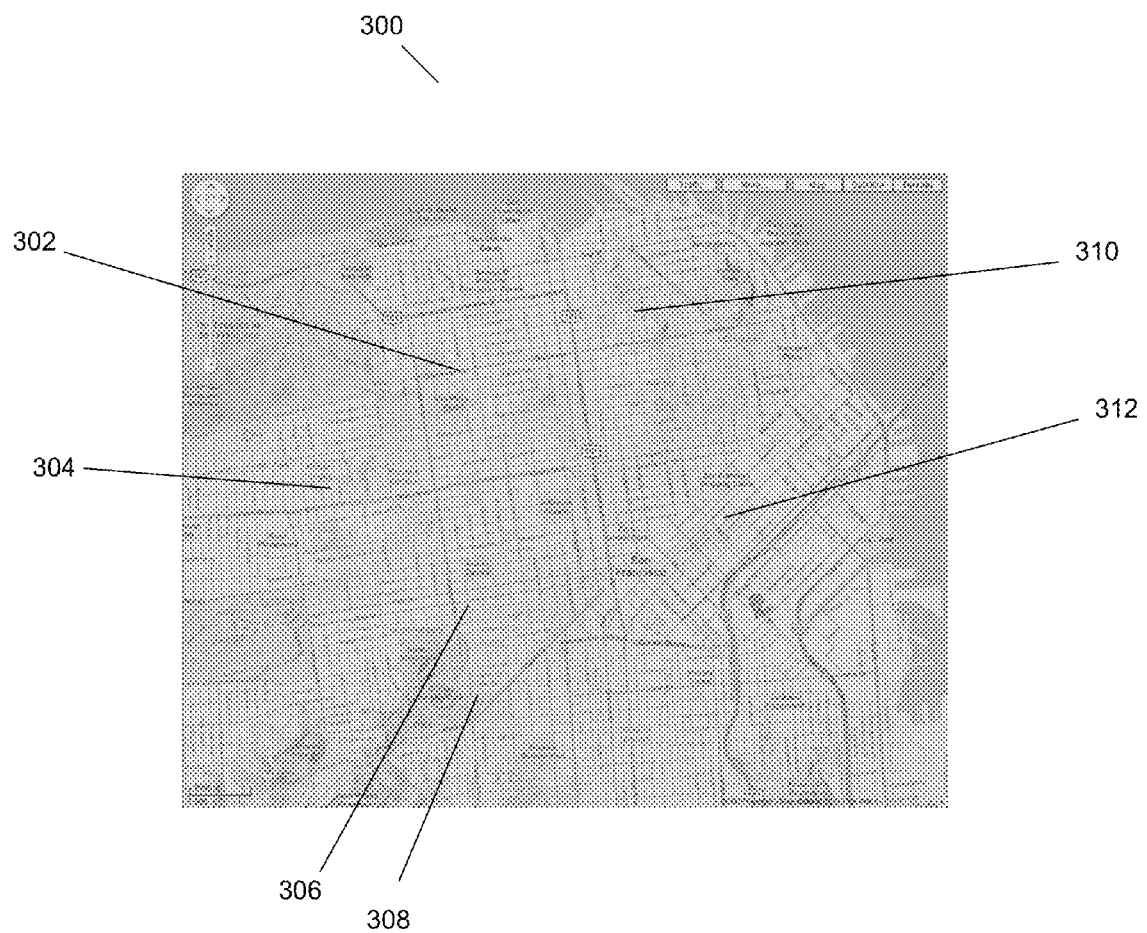
FIG. 3 is a diagram illustrating a scalar value field without any filtering in accordance with an embodiment of the present invention.

The scalar value field contains, after traversal, a value for each cell that represents the relative relevance of that cell location for the user, in terms of how much time she spends there. Areas such as home, office, favorite restaurant or coffee house will eventually emerge as places of relevance and thus have a higher scalar value than other areas that are visited less often. FIG. 3 is a graphical representation of a personal footprint scalar field 300. In one embodiment, areas of higher relevance 302, 304, 306, 308, 310 are color coded, for example in a blue-green-yellow-red gradient; or, alternatively, shaded differently or highlighted differently to show areas of lower and higher relevance.

Figure 4:
FIG. 4 is a diagram illustrating a scalar value field with a time filter applied in accordance with an embodiment of the present invention.

In order to make the sampled data more useful to the user, a time-based filter can be applied into the values processed in the personal footprint traversal operation, so that, for example, server 104 selects only samples that correspond to certain times—perhaps, weekday morning activities—by computing a weight factor determined by the time-of-week value associated with each sample, which is then used to multiply each sample's contribution to the cell count when traversing. The function that determines the weight can be a step function, which makes the weight factor be 0.0 outside of the specified time range and 1.0 when inside, or it can have a smoother ramp where, if mornings are specified, the weight factor will start, e.g., at 0.0 at six in the morning, slowly increase up to 1.0 from six to eight, and the slowly start to decline again from eleven to noon, when it reaches 0.0. In one embodiment, the time factor is pre-computed for the desired time range and stored as a look up table that is used to determine the weight factor for each sample and the current time range settings. FIG. 4 shows the area 400 from FIG. 3 with a time filter applied during the dataset traversal, and indicates a high concentration of visits by the user to a particular area 402 during the period of interest.

In various embodiments, other filters are applied to modify the data. For example, the value for locations with a number of samples greater than a given number can be clamped to that value, to make extremely predominant locations less dominant, since sometimes a primary location such as the user's home may overshadow other areas of interest. In addition, it is also possible to use other filtering factors such as area filters or even negative sample points that subtract from the scalar value in some regions. According to one embodiment, a travel filter is employed, which identifies frequently-traveled routes by clamping the number of samples to a small number and further weighting the samples according to the diversity of time values.

After a footprint for the desired time range has been computed by traversing the sample database quadtree, spatial query module 114 can perform relatively efficient queries by determining the target cell for a given queried location and either returning the closest value in the scalar field for the desired target resolution, or if more detail is needed, by interpolating the scalar values of neighboring cells according to the query coordinates. This process allows prioritization of a list of search results which, for example, can be obtained using a conventional search engine, by sorting them according to the computed values on the scalar field for their respective coordinates, on the basis that the higher the value for a given query coordinate, the closer it will be to areas of high relevance for the user.

Because in search applications response time is of great importance, and for large datasets the traversal time can be significant, in one embodiment the most common combinations of filtered footprints—for example, weekdays, weekends, morning, lunchtime, evening, weekday mornings, weekend evenings, travel, etc., can be pre-computed and stored along with the sample data on each cell, and updated on the fly as samples are added to the database. For more detailed time range queries it may be necessary to traverse and filter the dataset, but the result can be cached and reused for subsequent queries.

Figure 5:
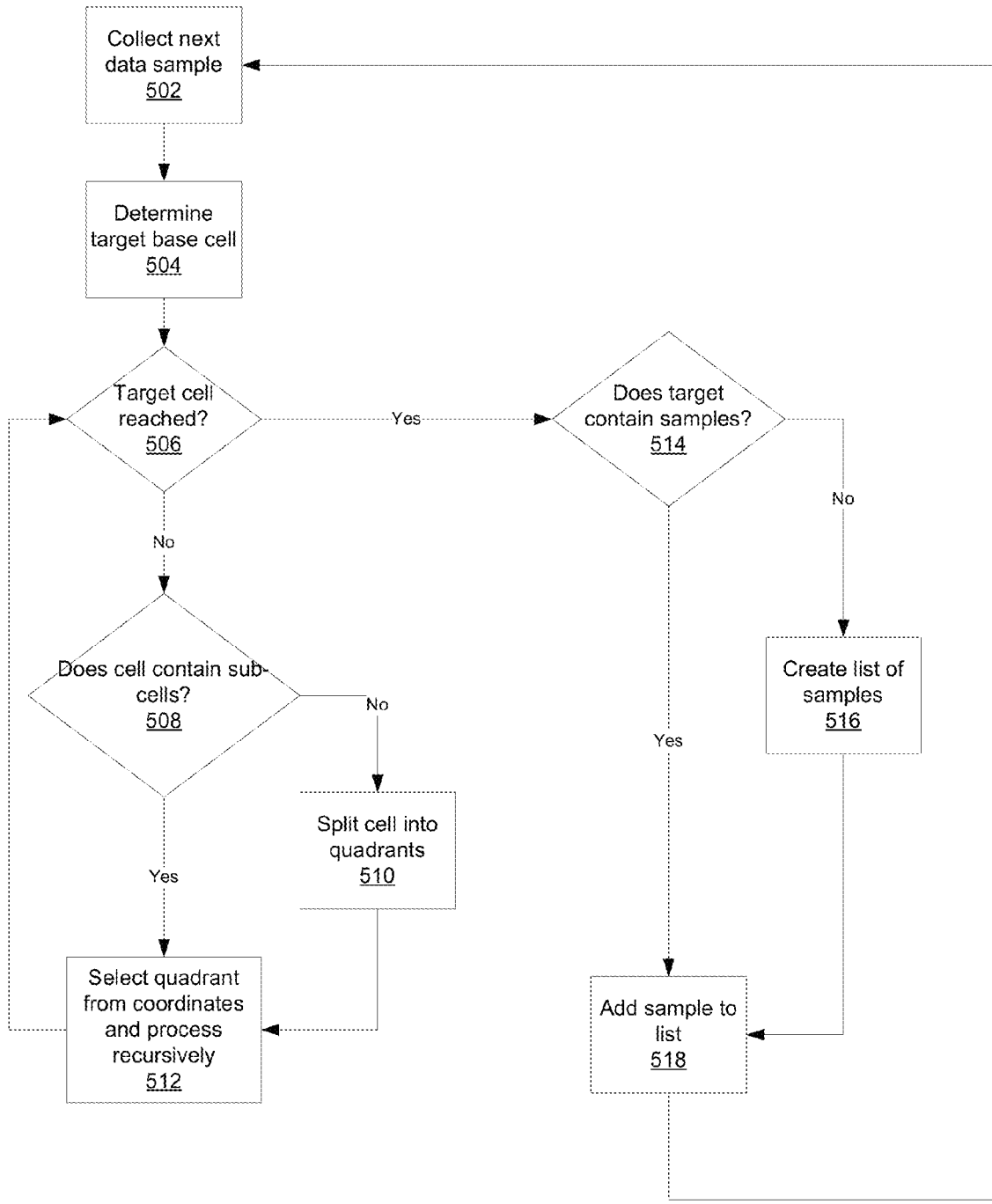
FIG. 5 is a flow diagram illustrating a data collection process in accordance with an embodiment of the present invention.

FIG. 5 illustrates a process used in one embodiment to collect and store data samples on the data collection module 106 in a quadtree data structure as a flow diagram. The process starts with the collection 502 of the next position and time sample on the mobile device. Its spatial coordinates are used to determine 504 the target cell on the grid of the quadtree data structure used to store the samples as described by querying the top cell and descending into the hierarchy of quadrants on each cell if quadrants are present. A test is performed 506 to determine if the base resolution for the cell grid has been reached, or further recursive subdivision is necessary. If the target resolution has not been reached, processing module 108 determines 508 whether the current cell already contains sub-cells. If it does not, the cell is split 510 into four quadrants, and in either case the appropriate quadrant is selected 512 for further processing in a recursive fashion. On the other hand, if the target cell resolution has been reached, processing module 108 determines 514 if the target cell already contains a list of samples. If it does not it is created 516, and in any case the sample is added 518 to the cell's list 518, and the process starts again with the collection 502 of the next sample.

Figure 6:
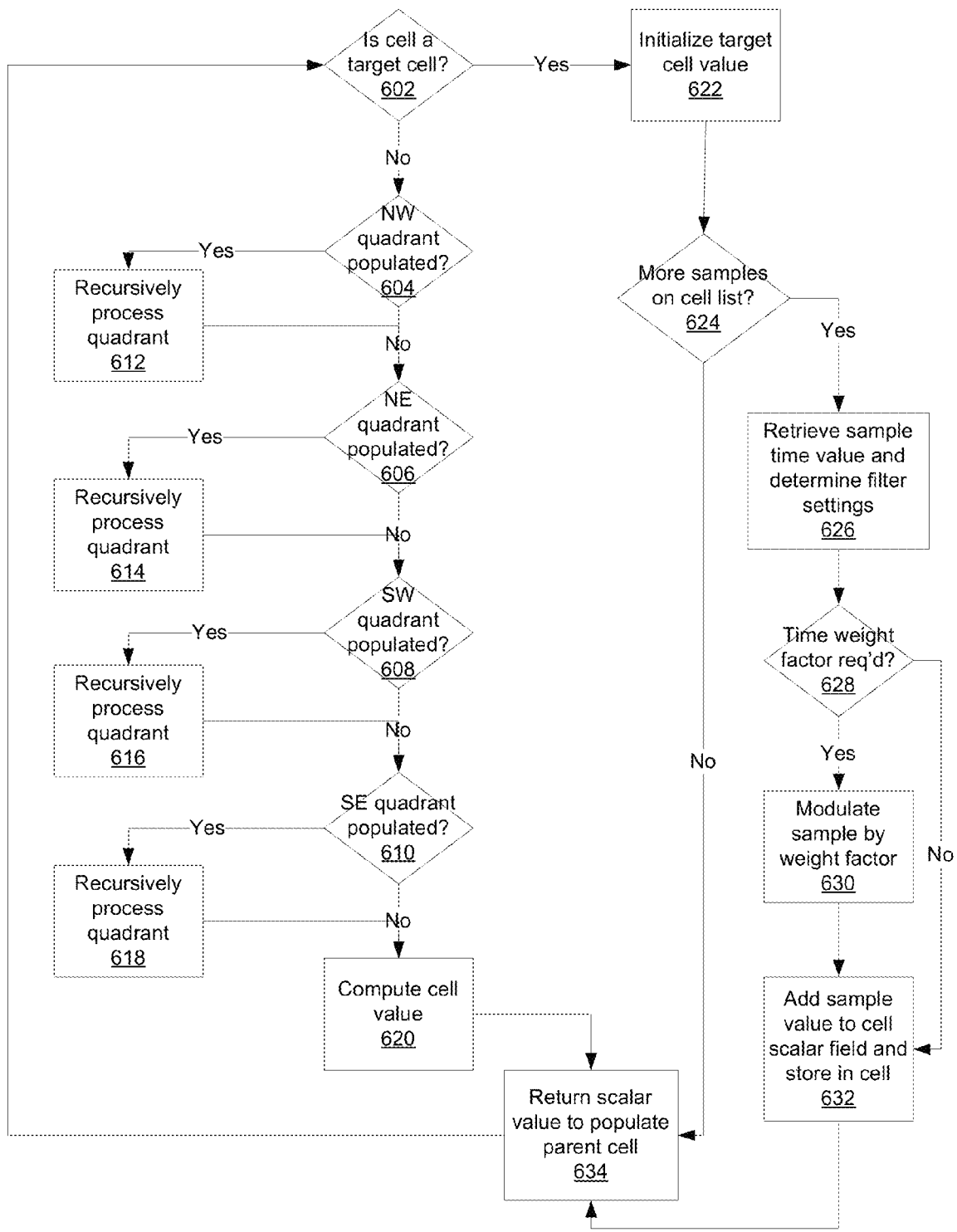
FIG. 6 is a flow diagram illustrating a traversal process for creation of a scalar field from a source sample database in accordance with an embodiment of the present invention.

FIG. 6 illustrates a traversal process used in one embodiment for the creation of a scalar field from the source sample database as a flow diagram. This is a recursive process where the value field processing module 108 starts traversing the quad tree structure at its top cell and descend into cell quadrants if present to determine the contribution of each cell to the scalar value field. Processing module 108 begins by determining 602 whether the cell processed is a target resolution cell, which would contain as seen in FIG. 5 a list of samples, or an intermediate cell that is split into quadrants of one-fourth of the area coverage. If it is not a target cell, processing module 108 tests 604, 606, 608, 610 to see whether each one of its four quadrants is populated, and if they are, recursively processes 612, 614, 616, 618 those cells and, using the values returned for each one of them if present, computes 620 a scalar value for the cell by adding the returns and dividing the result by 4. If, on the other hand, module 108 is processing a target cell, it initializes its scalar value by setting it 622 to 0, and for each sample present 624 on the cell's list, retrieves 626 the sample value and filter settings, determine 628 whether a weight factor is required, and if so, multiplies 630 the sample value by its current filter weight. Each sample's contribution is then added 632 to the cell's scalar value until there are no more samples to process, and for both intermediate and target cells the updated cell value is returned 634 so it can be propagated to its parent cell. After this process has been recursively executed for the whole quad tree, each cell contains a scalar value representation of the contribution of the data samples for that particular location.

Figure 7:
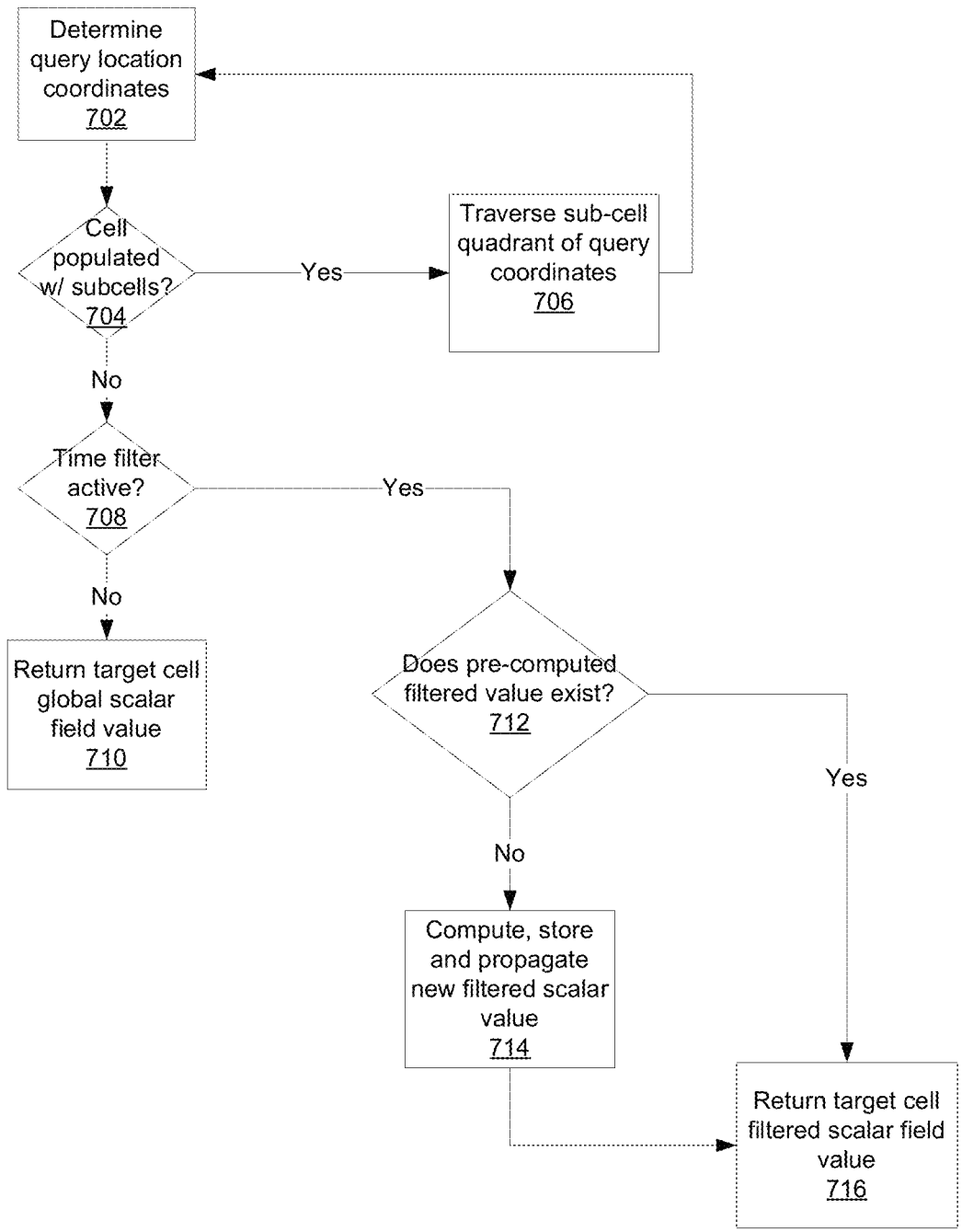
FIG. 7 is a flow diagram illustrating a spatial query process in accordance with an embodiment of the present invention.

FIG. 7 is a flow diagram illustrating one embodiment in which a relevance spatial query traversal process is carried out by the position query module 114. This process is a recursive traversal of the quadtree data structure, and query module 114 starts by determining 702 the local grid coordinates for the desired query location, and determining whether 704 the cell quadrant at the current processing level is populated with sub cells. If it is, query module 114 recursively traverses 706 the proper quadrant cell, restarting the process for the child cell. If query module 114 is at a target cell or the sub cell quadrant is not populated, module 114 determines 708 whether time filtering is active, and if it is, also determines 712 whether a pre-computed value has already been stored for this cell and filter parameters. If it has not been computed, it is determined 714 and in any case module 114 then returns 716 the desired value. If, conversely, no filtering is required, the base scalar field value for the cell is returned 710. By following this recursive process, the target value for a cell is efficiently determined with as much precision as allowed by the target cell resolution settings. If higher precision is needed on the scalar values, this same process can be applied to interpolate grid values for the desired target coordinates by determining the scalar value at neighboring grid points and performing a bilinear interpolation between them.

Scalar values are interpolated in one embodiment by determining the four adjacent grid cells at the desired resolution level, and if those cells are not populated, searching the parent level for values to interpolate from recursively until suitable values are found. In addition to allowing the scalar values computed for nearby points to be differentiated, this has an additional advantage of applying a box filter to the scalar data field, smoothing out the computed result. Larger interpolation windows including additional samples are also possible applying similar methods, resulting in an even smoother data field.

This interpolation process is well known to those skilled in the field of computer graphics, and is similar to the process required for filtering texture maps as they are minified and magnified when applied to geometric primitives. In its simplest form, each coordinate is interpolated independently and then combined in what is called bilinear filtering. A more advanced technique known as mip-mapping, first introduced by Williams ["Pyramidal parametrics", Williams 83], incorporated by reference herein, relies on pre-computed filtered tables of progressive power-of-two resolution and a process to compute target interpolated values for two adjacent levels by using bilinear interpolation on each one of them as before, and performing a linear interpolation of both results. All of these texture mapping filtering techniques can be applied to the scalar data field of system 100 to generate smooth interpolated scalar values for any given query target coordinate. This interpolation process allows more accurate results to be returned for areas where multiple potential results are located close to each other.

After the scalar value field of a personal footprint is in place, it is possible to use it as a basis for more advanced queries. Well-established techniques familiar to those skilled in the art include the creation of iso-surfaces where values of equal scalar field value are meshed together in a three-dimensional volume. It is possible then to do geometrical queries against this volume, making it easy to determine spatial relations according to a pre-determined threshold value of relevance for the user.

Another possibility is to compute the interaction between multiple footprints, by adding, subtracting or multiplying several scalar fields together, or considering more advanced intersections using the aforementioned iso-surface volumes. This has potential applications in areas such as social networking, by allowing queries that are not only relevant to one user and that can be relevant to multiple users, capturing how their personal footprints interact with those of other users. It can, for example, help determine a lunch restaurant that is close and convenient for a group of friends during their Monday-to-Friday lunch hour by picking candidate restaurants that are relatively close to the intersection of all of the user footprints.

Figure 8:
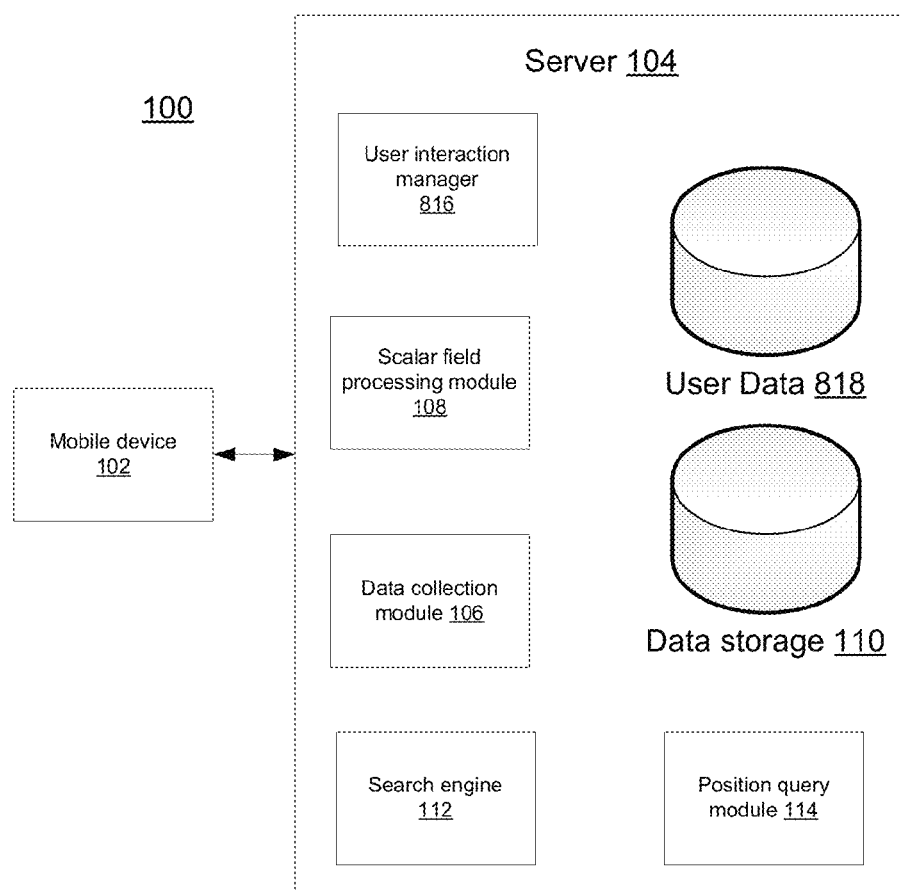
FIG. 8 is a block diagram of a system for performing local search optimization using personal footprints and social networks in accordance with an embodiment of the present invention.

FIG. 8 illustrates an embodiment of system 100 in which a user's social network enhances search query results. In the illustrated embodiment, server 104 additionally includes a user interaction manager 816 and user data store 818. User data store 818 maintains information about each user of system 100, including, for example, an account identifier, mobile device identifier, account identifiers for the user's friends, and privacy information. The account identifier in one embodiment is an index into data store 110, where collected and processed position and time sample data and each user's footprint is stored. User interaction manager 816 determines interactions between multiple footprints, as described above for example, by adding, subtracting or multiplying scalar fields together based on a query received by search engine 112. In various embodiments, queries to search engine 112 include a query term (e.g., "Chinese restaurant," "furniture store," "dentist", etc.), a time of day (e.g., "morning," "between 10 am and noon", "lunch time", "commute hours," etc.), and a set of other users to use to enhance search results (e.g., "near John's apartment," "where my friends eat often", etc.). Search engine 112 then conducts the search and weights search results in accordance with specified filters, such as time of day, and friends' patterns as made available through user interaction manager 816. Note that a friend's privacy settings in one embodiment prevent some or all of that friend's footprint from being included in search results, thus ensuring each user's privacy is respected.

It is also possible to connect points of similar relevance and close in time into a graph data structure if data is captured with relatively high periodicity, and after enough data has been captured these points of similar relevance and closely sequenced in time can be used to established paths and routes. For example, if the user's mobile device captures a sample every five minutes each morning, it is quite likely the user's morning commute may be captured after some time, and a repeating pattern of points related in time and space will emerge. This data can then be used to further refine queries.

System 100 in various embodiments enables a user to exert control over the privacy of her personal data. Data can be stored on the user's device 102 if desired, or alternatively on the server 104. As described above, the user can enable or disable data capture as desired. In one embodiment no specific times and locations are stored, only approximate grid locations and time of week are required and the rest of the data (the actual specific location and date of the sample) can be discarded. In various embodiments, privacy settings allow the user to control how much, if any, of her personal footprint is shared with other users in her social network. There is an emerging consensus on the market for mobile location aware services (such as Loopt, Foursquare, Google Latitude and others) that is establishing a legal framework for data ownership, privacy and rights, and the described invention fits into that framework without constraining its usefulness.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the data collection module, scalar field processing module and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A system for performing optimized local searches using a mobile device, comprising:
   a data collection module, adapted to receive sampled position data from each of a plurality of mobile devices over a network at a plurality of sample times;
   a scalar field processing module, coupled to the data collection module, adapted to determine a footprint of geospatial locations frequented by each mobile device user and associated times at which the locations are frequented;
   a data storage device, coupled to the data collection module, adapted to store sampled position data and scalar field processed data;
   a search engine, adapted to receive search requests over a network, execute searches based on query terms in the search requests, and to provide search results over the network; and
   a position query module, coupled to the search engine, adapted to receive search results from the search engine and correlate the search results with an overlap, across multiple mobile device users, of the determined footprints stored on the data storage device to rank the search results according to a proximity to locations forming the overlapped footprint.

2. The system of claim 1 further comprising:
   a user data store, coupled to the data storage device, adapted to maintain social networking information for each of the users associated with the plurality of mobile devices; and
   a user interaction manager, coupled to the position query module, adapted to create the overlapped footprints according to the social networking information in the user data store.

3. The system of claim 2 wherein the overlapped footprints include an intersection of footprints determined for each of the mobile device users connected to each other according to the social networking information.

4. A method for providing personalized search results to users of a mobile device, the method comprising:
   for each of a plurality of mobile devices, each mobile device associated with one of a plurality of users, each of the plurality of users connected to each other in a social network:
      sampling a location of the mobile device at a plurality of times;
      determining from the sampled location data a user footprint for the associated user, the footprint identifying a plurality of locations frequented by the user;
   receiving a search request, the search request including a search term;
   executing a search using the search term to obtain a plurality of search results, each result having an associated location;
   ranking the search results according to a proximity of the location associated with each result to an overlap of the footprints across the plurality of users; and
   returning in response to the search request the ranked search results.

5. The method of claim 4 wherein the user footprint includes time information associated with the plurality of locations, the search request includes a timeframe, and further comprising ranking the search results based on the timeframe in the search request and time information associated with the footprints.

6. The method of claim 4 wherein the user footprints include time information associated with the plurality of locations and further comprising ranking the search results based on the time the search request is received and the time information associated with the footprints.

7. The method of claim 4 wherein the location of the mobile device is sampled automatically.

8. The method of claim 7 wherein the sampling occurs at periodic intervals of time.

9. The method of claim 7 further comprising:
   receiving a first user input to stop sampling the location;
   receiving a second user input to start sampling the location; and
   halting the automatic sampling of the location of the user device during the interval between the first user input and the second user input.

10. The method of claim 4 wherein the location of the mobile device is sampled manually.

11. The method of claim 10 wherein sampling the location of the mobile device further comprises:
   receiving from the user indicia of a landmark; and
   using a location of the indicated landmark as the sample location.

12. The method of claim 4 wherein ranking the search results further comprises:
   prioritizing each result according to the number of footprints of the plurality over of users that overlap at the location associated with the result.

13. The method of claim 4 wherein the request is received from a user of one of the mobile devices.

14. The method of claim 4 wherein the search request is received from a user connected to at least one of the plurality of users in the social network.

15. A computer program product for providing personalized search results to users of a mobile device, the computer program product stored on a non-transitory computer-readable medium and including instructions configured to cause a processor to execute the steps of:
   for each of a plurality of mobile devices, each mobile device associated with one of a plurality of users, each of the plurality of users connected to each other in a social network:
      receiving location samples describing locations of the mobile device at a plurality of times;
      determining from the sampled location data a user footprint for the associated user, the footprint identifying a plurality of locations frequented by the user;
   receiving a search request, the search request including a search term;
   executing a search using the search term to obtain a plurality of search results, each result having an associated location;
   ranking the search results according to a proximity of the location associated with each result to an overlap of the footprints of across the plurality of users; and
   returning in response to the search request the ranked search results.

16. The method of claim 4, wherein sampling the location of the mobile device further comprises:
   collecting a position and time sample on the mobile device, the sample including spatial coordinates;
   using the spatial coordinates to determine a target cell on a grid of a quadtree data structure for storing the samples;
   determining whether the target cell already contains a list of samples;
   responsive to the target cell not already containing a list of samples, creating a list of samples; and
   adding the sample to the list of samples.

17. The method of claim 15 wherein determining a target cell further comprises:
   querying a top cell on the grid of the quadtree data structure to determine whether a target resolution has been reached;
   responsive to the target resolution not having been reached:
   determining whether the cell contains sub-cells;
   responsive to the cell not containing sub-cells:
   splitting the cell into quadrants, and recursively querying each quadrant until the target resolution has been reached.

* * * * *

UNITED STATES PATENT AND TRADEMARK OFFICE
CERTIFICATE OF CORRECTION

| | | |
|---|---|---|
| PATENT NO. | : 8,706,719 B1 | Page 1 of 1 |
| APPLICATION NO. | : 12/854167 | |
| DATED | : April 22, 2014 | |
| INVENTOR(S) | : Sanz-Pastor et al. | |

It is certified that error appears in the above-identified patent and that said Letters Patent is hereby corrected as shown below:

In the claims
Column 12, line 45, delete "15", insert --16--.

Signed and Sealed this
Twenty-second Day of December, 2015

Michelle K. Lee
*Director of the United States Patent and Trademark Office*